Inventor:
William L. Sheppard
By Edward P. Gritzbaugh
Atty.

Sept. 30, 1947.  W. L. SHEPPARD  2,428,128
CONTROL AND DRIVE MECHANISM FOR HELICOPTER ROTORS
Filed July 14, 1943  2 Sheets-Sheet 2
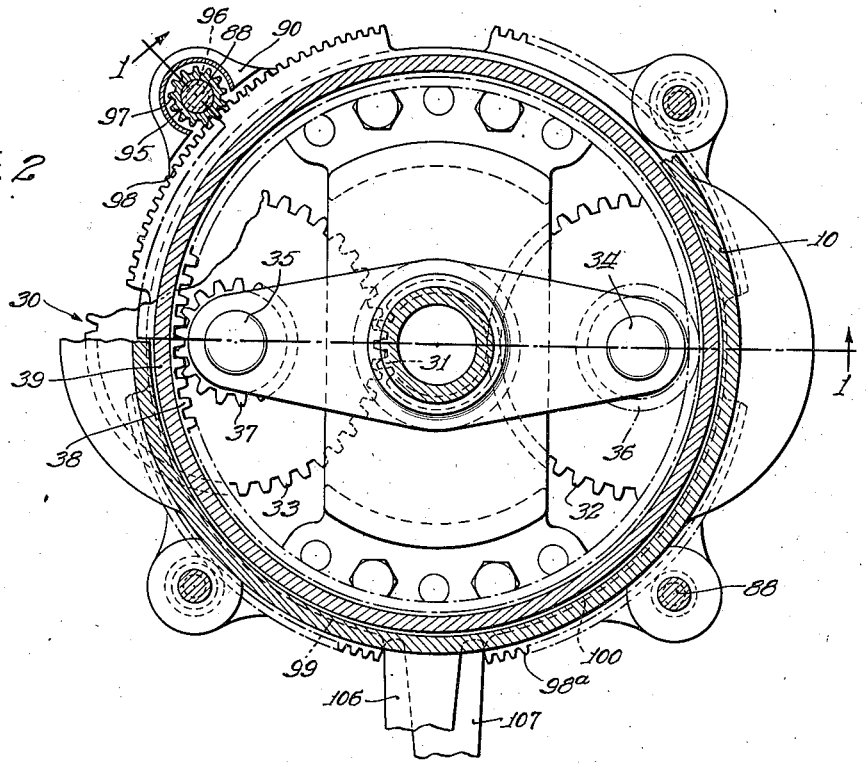
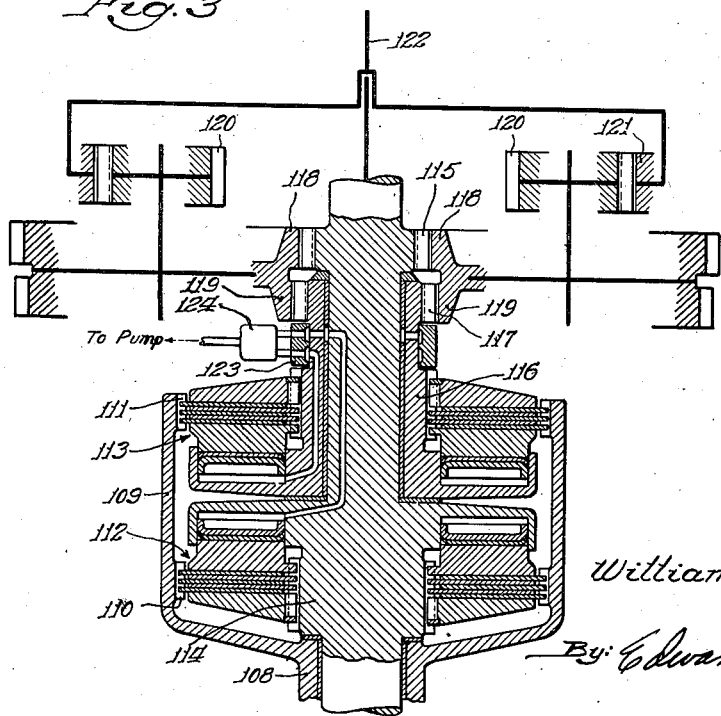
Inventor:
William L. Sheppard
By: Edward C. Gutzbaugh
Atty.

Patented Sept. 30, 1947

2,428,128

UNITED STATES PATENT OFFICE 2,428,128

CONTROL AND DRIVE MECHANISM FOR HELICOPTER ROTORS

William L. Sheppard, Royal Oak, Mich., assignor to Borg-Warner Corporation, Chicago, Ill., a corporation of Illinois Application July 14, 1943, Serial No. 494,620

12 Claims. (Cl. 244—17)

1

This invention relates to helicopters and to drive and control mechanisms used in connection with the sustaining rotor thereof. The invention has particular reference to the transmission gearing adapted to drive the sustaining rotor.

In helicopters, as at present constructed, the sustaining rotor rotates about a vertical shaft which is driven from a suitable prime mover secured to the fuselage. In order to test the engine without driving the rotor it is necessary to provide a clutch for disconnecting the engine from the rotor drive shaft. When the rotor is driven, however, a substantial torque multiplication and speed reduction between the drive shaft and rotor must be provided, and this is done by means of a gear type transmission which is interposed between the rotor and the clutch. In addition to rotating about a vertical axis the pitch of the rotor blades must be controllable in order to control the movement of the helicopter. For this reason a control mechanism is provided between the transmission and rotor blades which functions simultaneously to change the pitch of all of the blades to control the lifting characteristics of the rotor and also to change the pitch of each blade individually as the blades pass over certain sectors of their path of movement to control the lateral motion of the helicopter. Thus three distinct instrumentalities are required in a rotor drive; (1) the clutch, (2) the transmission gearing, and (3) the pitch control.

In order to increase the pay load which the helicopter can carry the weight of all parts of the helicopter including the clutch, transmission and control mechanism must be reduced to a minimum. This has not been done in helicopters heretofore designed, since each one of these devices has been treated as a separate mechanism and enclosed in a separate housing thus duplicating certain supports, lubricating systems, fasteners, etc., all of which resulted in a large amount of unnecessary weight. In addition, the separate treatment of these devices increased the cost of each and rendered more difficult the assembly and installation of the devices in the helicopter.

The principal object of this invention is to provide a clutch, transmission and control mechanism for a helicopter sustaining rotor, the combined weight of which is materially reduced over similar devices heretofore proposed.

Another object of this invention is to provide a simple control mechanism for the pitch of the sustaining rotor blades of a helicopter which utilizes for its support portions of the transmission used to drive the rotor.

2

Another object of this invention is to provide a combined clutch, transmission and rotor control mechanism which may be manufactured as a unit for connection to the end of a shaft driven by the engine by which the helicopter is powered.

A subordinate object of this invention is to improve and simplify the control for the clutch by providing a control mechanism for the clutch which will automatically disengage the clutch when the helicopter is resting on the ground and the rotor blades are pitched so as to produce no lift.

Another subordinate object of this invention is to provide a multispeed transmission for a helicopter, said transmission being adapted for use in place of the single speed transmission heretofore employed.

These and other objects of this invention will become readily apparent from the following detailed description when taken together with the accompanying drawings in which:

Fig. 2 is a transverse section taken through the transmission of Fig. 1 along lines 2—2; and Fig. 3 is a schematic diagram of the manner in which the transmission of Fig. 1 may be modified to produce two speeds.

Figure 1:
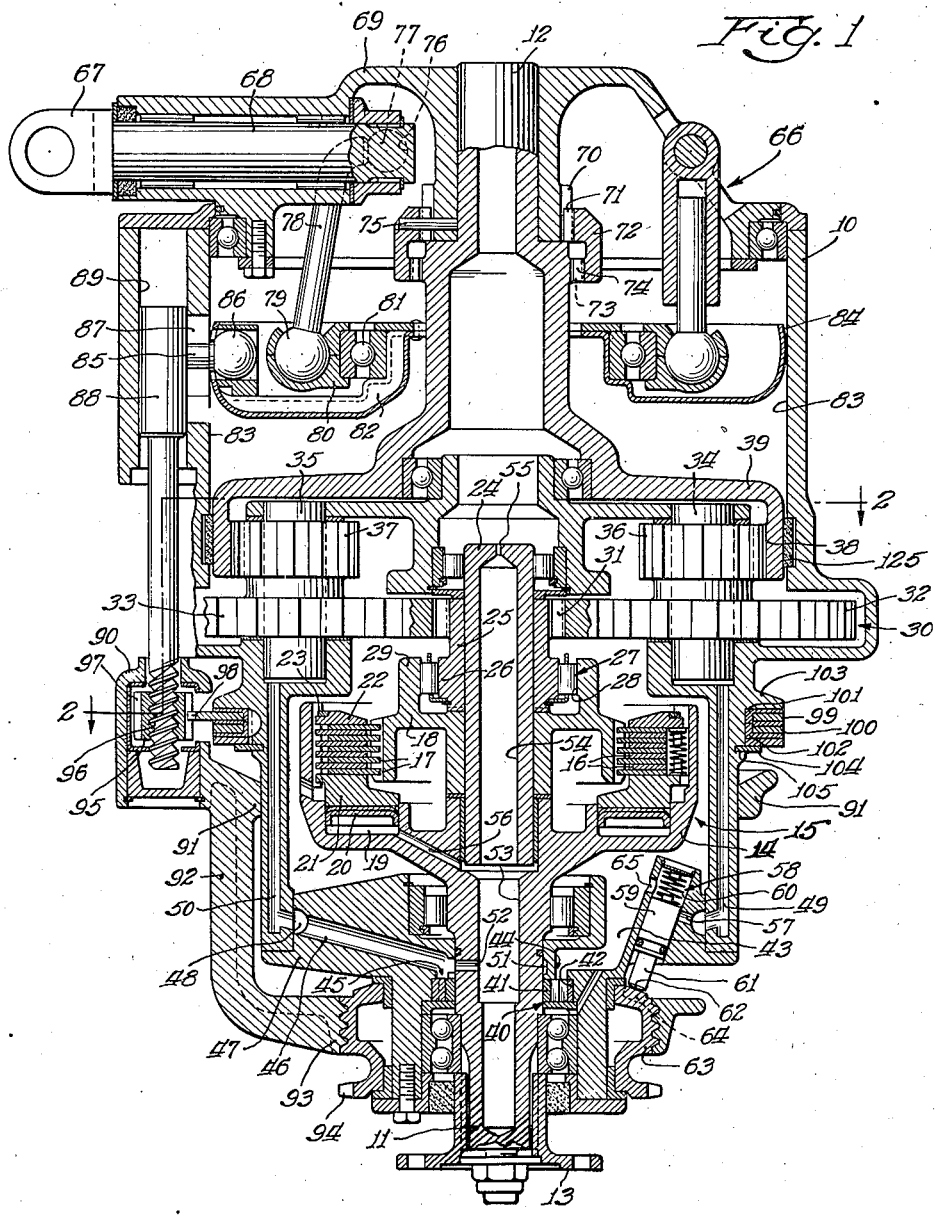
Fig. 1 is a section through the improved combined clutch, transmission and rotor blade control mechanism taken along lines 1—1 of Fig. 2.

Referring now to Fig. 1 for a detailed description of the invention, the transmission is comprised of a housing 10 of generally cylindrical shape as shown in which are coaxially disposed input and output shafts 11 and 12, respectively. A flange 13 is splined to input shaft 11 and is connectible by any suitable means to the prime mover (not shown) of the helicopter. Input shaft 11 is enlarged at its upper end 14 to form the drive member of a multi-plate friction clutch 15. Said clutch 15 is comprised of a series of drive plates 16 which are splined at their outer peripheries to the enlarged portion 14 of the input shaft. Corresponding driven plates 17 are interposed between the drive plates 16 and are splined at their inner peripheries to the driven member 18 of the clutch. Clutch 15 is adapted to be operated by fluid pressure and to this end enlarged portion 14 is formed with an annular chamber 19 in which is disposed an annular piston 20 acting directly upon a pressure plate 21. A reaction plate 22 is also splined to the enlarged portion 14 and is prevented from moving upwardly of the splines by a snap ring 23.

Piloted in input shaft 11 is an intermediate shaft 24 on which driven member 18 is freely rotatable. Also freely rotatable on intermediate shaft 24 is a sleeve 25 the lower portion 26 of which constitutes the cam member of a roller-and-cam type of one-way clutch device 27, the rollers of which operate against a cylindrical surface 28 formed in an upwardly extending axial flange 29 on clutch driven member 18.

Sleeve 25 constitutes the input member for speed reduction gearing designated generally by the reference character 30. Said gearing 30 is comprised of a pinion gear 31 which may be formed integrally with sleeve 25 at the upper end thereof and which meshes with a plurality of gears 32 and 33. A pair of countershafts 34 and 35 held in housing 10 support countershaft gears 32 and 33 respectively and support in addition relatively smaller countershaft gears 36 and 37, rotatable with countershaft gears 32 and 33, respectively. For ease of construction, gears 32 and 36 may be formed integrally as elements of a spool gear, as may likewise the other pair of gears 33 and 37. The smaller countershaft gears 36 and 37 mesh with a ring gear 38 which may be formed in the enlarged end 39 of output shaft 12.

It will be apparent from the arrangement of the gearing that a considerable speed reduction and a corresponding torque multiplication is effected between sleeve 25 and output shaft 12 through the gearing just described.

The pressure required to operate clutch 15 and to lubricate the rotating parts located within housing 10 is supplied by a pump 40 preferably disposed concentrically with respect to input shaft 11 to simplify the drive thereof. Pump 40 is comprised of a pinion gear 41 rotatable with input shaft 11 and meshing with an internal gear 42 freely rotatable in housing 10. Pinion gear 41 has one tooth less than internal gear 42, and the teeth of both gears are so formed that a continuous seal is provided between the input and output sides of the pump. The entire pump is located in the lower portion of housing 10 which constitutes the sump 43 of the transmission.

The oil in sump 43 is drawn by pump 40 from the input side 44 and is forced at the output side 45 into a conduit 46 formed in the end plate 47 of housing 10. Conduit 46 terminates in an annular chamber 48 which communicates with drilled openings 49 and 50 feeding the oil directly to countershafts 34 and 35 respectively. The pressure side 45 of pump 40 also communicates with an annular chamber 51 which surrounds input shaft 11. A radially disposed drilled opening 52 in shaft 11 conducts the oil from chamber 51 into a chamber 53 formed inside shaft 11. Intermediate shaft 24 is also drilled centrally to form a chamber 54 which is in direct communication with chamber 53. The upper end of chamber 54 is provided with a restricted orifice 55 the capacity of which is considerably smaller than the capacity of pump 40, so that under normal operating conditions it does not materially affect the pressure of the oil in chambers 53 and 54. A conduit 56 permits the oil in chambers 53 and 54 to pass into clutch chamber 19 so that clutch 14 is operative whenever the oil in chambers 53 and 54 has been placed under clutch operating pressure.

Chamber 48 also communicates through an opening 57 with a valve chamber 58 in which is located a valve 59. A spring 60 constantly urges valve 59 downward as viewed in Fig. 1 and a valve stem 61 operating against a conical surface 62 on a threaded rotor blade pitch control member 63 limits the downward movement of valve 59. Under normal operating conditions valve 59 is in the position shown, but when threaded member 63 is rotated to a predetermined position corresponding to neutral or no lift condition of the rotor blades, stem 61 drops into a recess 64 and uncovers opening 57. This permits the oil to flow into valve chamber 58 and then outward through an opening 65 into sump 43 thereby dumping all of the pressure in the system.

The control mechanism for the sustaining rotor blades of the helicopter is shown generally at 66 and is located above transmission 30. The individual blades (not shown) are secured, through suitable linkage (not shown), at 67 to a shaft 68 rotatably mounted in a rotor hub 69 which in turn is rotatably mounted on the upper end of output shaft 12. Said hub 69 is provided with external splines 70 which engage internal splines 71 on a collar 72. Splines 70 and 71 are helical splines and are so arranged that should hub 69 turn faster in the direction of drive than output shaft 12, collar 72, if restrained from rotating with hub 69, will move upwardly along splines 70. Output shaft 12 is provided with straight splines 73 which mesh with similar internal straight splines 74 formed in collar 72. The drive from output shaft 12 to casting 69 is transmitted through straight splines 73 and 74 to collar 72 and then through a shear pin 75 to casting 69. Should the load on pin 75 become too great the pin will shear and collar 72 will then rise on splines 70 due to the driving action on straight splines 73 and 74 until collar 72 is free of splines 73. This is a safety feature which is employed in the event transmission 30 jams.

The inner end of rotor blade shaft 68 is provided with a bell crank (not shown) in which is a ball socket 76 retaining the ball end 77 of a connecting lever 78. Said lever 78 extends downwardly and is connected by means of a second ball socket joint 79 to an annular support 80 which is freely rotatable in housing 10 through ball bearings 81 mounted in a wobble plate 82. Said wobble plate contacts the cylindrical inside surface 83 of the upper portion of the housing 10. The outer surface 84 of wobble plate 82 is spherical in contour so that the plate may move vertically in housing 10 or it may be inclined at any angle with respect thereto while maintaining a supporting contact with cylindrical surface 83.

The movement of plate 82 is controlled by means of four pins 85 (Figs. 1 and 2) having a ball socket connection 86 therewith and operating in slots 87 in the wall of housing 10. Said pins 85 are doweled into a rod 88 which rides in drilled openings 89 in housing 10, the openings 89 being disposed with their axes parallel to the axis of output shaft 12. Rods 88 extend downwardly into bosses 90 formed in a ring 91 which is adapted to slide vertically on the cylindrical outer surface of the lower portion of housing 10. Said ring 91 is connected by depending arms 92 (only one of which is shown) to a lower ring 93 which is threaded internally and cooperates with the external threads on control member 63. A sprocket 94, rotated by suitable operator controlled means (not shown), turns control member 63, and since rings 91 and 93 are restrained from rotating by rods 88, the rotating movement of sprocket 94 raises and lowers ring 93, arms 92 and ring 91. This motion is transmitted to rods 88 by means of nuts 95 which engage the threaded ends 96 of the rods. It is contemplated that diametrically opposed nuts and their cooperating threaded ends of the rods will be oppositely threaded, that is, one will have a lefthand thread and the other a righthand.

It will be apparent from the control mechanism thus far described that all rods will be moved simultaneously an equal amount whenever sprocket 94 is rotated. This mechanism therefore regulates the rate of climb of the helicopter since the equal movement of the rods 88 effects a uniform movement of wobble plate 82 which in turn results in a uniform change in pitch in all of the rotating blades.

A change in the pitch of individual blades over certain portions of their cycle of movement around housing 10 is effected by advancing or retracting the nuts 95 on rods 88. To effect such individual movement of the nuts, each nut is formed on the outside thereof with spur teeth 97 which engage gear sectors 98 and 98a (Fig. 2) formed in the outer peripheries of plates 99 and 100. The plates 99 and 100 operate in suitable bearings 101 and 102 respectively, mounted on the cylindrical exterior of housing 10 and retained against axial movement relative to the housing by means of a flange 103 formed in the housing and a stop ring 104 set into a groove 105 in housing 10.

Referring now specifically to Fig. 2, sector 98 and its opposed sector 98a are controlled by means of a lever 106 which may be formed integrally with ring 99 and which extends radially outwardly to a suitable manually operated control mechanism (not shown). Similarly ring 100 is provided with a lever 107 by which the sectors formed on ring 100 are controlled.

It will be apparent from Figs. 1 and 2 that the movement of control arms 106 and 107 in a circular direction will result in the individual movement of the nuts controlled thereby and that this movement may be superimposed upon the movement of rings 93 and 91 to secure a universal movement of wobble plate 92 thereby controlling the direction of movement of the helicopter laterally as well as vertically.

Under some conditions it may be desirable to provide two speed ratios for the rotor of the helicopter. This may be accomplished by the modification shown in Fig. 3. Referring now to Fig. 3, the input shaft is shown at 108 and is formed with a drum 109 in which are two sets of splines 110 and 111. Splines 110 serve to drive a clutch 112 and splines 111 drive a clutch 113. Clutches 112 and 113 are operated by oil under pressure and may be similar to clutch 15 shown in Fig. 1. The driven member 114 of clutch 112 comprises a shaft which extends upwardly of the transmission and terminates in a gear 115. The driven member 116 of clutch 113 is comprised of a sleeve rotatably mounted on shaft 114 and terminating in a gear 117 which is larger in diameter than gear 115 and disposed adjacent thereto. A pair of countershaft gears 118 meshes with gear 115 and a second pair of countershaft gears 119 meshes with gear 117. A third pair of countershaft gears 120 meshes with an internal gear 121 which is connected to an output shaft 122. Gears 118, 119 and 120 may be formed integrally as cluster gears. It is understood that input shaft 108 corresponds to input shaft 11 of Fig. 1 and output shaft 122 corresponds to output shaft 12 of that figure.

Clutch 112 is controlled by means of oil under pressure conducted to the clutch through a collector ring 123 which in turn is connected through suitable valve means 124 and passageways directly to the output side of a pump in the manner described with reference to clutch 15 of Fig. 1, and clutch 113 is also operated by fluid under pressure controlled through valve means 124 from the same pump.

To prevent the rotor from "windmilling" when the helicopter is at rest on the ground and a strong wind is blowing, a brake (Fig. 1) may be provided, the brake comprising a band 125 anchored to housing 10 and contractile upon the outer periphery of ring gear 38.

The operation of the transmission shown in Fig. 1, though apparent from the drawing and the description thus far given, may be described briefly as follows.

Assuming that drive shaft 11 is rotated at idling speed and assuming further that the operator has set the rotor controls for neutral, sprocket 94 will under such conditions be turned so as to aline valve stem 61 with recess 64 and open valve 59. Although pump 41 is operated whenever shaft 11 rotates, any pressure created by the pump will be dissipated through conduit 46, annular chamber 48, opening 57 (exposed by valve 59) and opening 65 in valve chamber 58. Since no pressure is available, clutch 15 will not be operated and hence gearing 30 will be disconnected from drive shaft 11. When the operator rotates sprocket 94 to pitch the rotor blades to a climbing angle, recess 64 will be turned out of alinement with valve stem 61 and the stem will rise to the conical surface 62, thereby causing valve 59 to close the opening 57. This permits pressure to be built up in the system, the pressure being communicated through radial opening 52 to chambers 53 and 54. Some oil will escape through restricted orifice 55 into the upper portion of housing 10 to lubricate the moving parts therein but the pressure will remain sufficiently high to cause the oil passing through conduit 56 into chamber 19 to operate clutch 15. This causes the driven member 18 to rotate at drive shaft speed and this motion will be transmitted through one-way clutch 27 to gear 31. The torque in gear 31 will then be multiplied in gears 33 and 37 and will be transmitted by these gears to internal gear 38 and ultimately into casting 69 which supports and drives the rotor blades.

Should the engine speed drop below that required to keep the blades rotating at the speed determined by the aerodynamic forces acting thereon one-way clutch 27 will release the drive and will permit the rotor blades to sustain the helicopter. It is obvious that in the event of power failure, one-way clutch 27 constitutes a safety feature which will permit the helicopter to descend without causing a crash.

Once clutch 15 is engaged, the pitch angle control for the blades provided by sprocket 94 and its associated apparatus and by levers 106 and 107 and their associated gear sectors may be operated and varied without affecting the operation of the transmission.

If the modification of the transmission shown in Fig. 3 is used in place of the transmission shown in Fig. 1 two driving ratios will be available for the rotor blades. Thus the operation of clutch 112 will cause the smaller of the two gears 115, 117 to become operative and will provide the larger speed reduction. This reduction may be useful for climbing purposes or in any situation where the load on the engine is too great to permit it to rotate at the speed corresponding to its greatest horse power capacity. Where, however, the helicopter has leveled off and is moving under conditions which do not require the maximum available horsepower clutch 113 may be operated to make effective the larger gear 117 and thereby decrease the speed ratio and the torque multiplication through the gearing. It is contemplated that clutches 112 and 113 will be mutually exclusively operable and that a period of overlap will be provided during the change from one clutch to another to prevent the engine from racing.

It will be apparent that since but one housing is used for the clutch, transmission and pitch control apparatus a very substantial saving in weight has been effected. This saving may be reflected either in an increase in power available for propelling and maneuvering the helicopter, or in an increase in the useful load that the helicopter can carry. It also results in fewer parts, a simpler lubrication system and a general saving in cost. It also makes possible the building and assembling of the clutch, transmission and control unit at a remote point in accordance with known mass production techniques, the three devices being readily shipped in a single container and installed in the same amount of time that it would take to install any one of the devices now designed as separate units.

It is understood that the foregoing description is merely illustrative of a preferred embodiment of the invention and that the scope of the invention is not to be limited thereto, but is to be determined by the appended claims.

I claim:

1. A drive mechanism for the sustaining rotor of a helicopter or the like, comprising a drive member, torque multiplying means, clutch means for connecting the drive member to the torque multiplying means, means connecting the torque multiplying means to the rotor, pitch control mechanism for the rotor including a wobble plate, and a housing for the clutch and torque multiplying means, said housing having an extension with a cylindrical inner surface therein for guiding the wobble plate.

2. A drive mechanism for the sustaining rotor of a helicopter or the like, comprising a drive member, torque multiplying means, clutch means connecting the drive member to the torque multiplying means, means connecting the torque multiplying means to the rotor, pitch control mechanism for the rotor; a housing for the clutch, torque multiplying means and pitch control mechanism; said housing having a cylindrical outer surface, operating means for the pitch control mechanism, and a member guided on the cylindrical outer surface of the housing for actuating said operating means.

3. A drive mechanism for the sustaining rotor of a helicopter or the like, comprising a drive member, torque multiplying means, clutch means connecting the drive member to the torque multiplying means, means connecting the torque multiplying means to the rotor, pitch control mechanism for the rotor including a wobble plate; a housing having a central portion enclosing the torque multiplying means, a cylindrical portion enclosing the clutch and a portion having a cylindrical inner surface enclosing the control mechanism and guiding the wobble plate; operating means for the pitch control mechanism, and a member for actuating said operating means, said member being guided on the outer surface of the cylindrical portion of the housing that encloses said clutch.

4. A drive mechanism for the sustaining rotor of a helicopter or the like, comprising a drive member, torque multiplying means, clutch means connecting the drive member to the torque multiplying means, means connecting the torque multiplying means to the rotor, pitch control mechanism for the rotor; a housing for the clutch, torque multiplying means and pitch control mechanism; an assembly for operating the pitch control mechanism to effect a lateral movement of the helicopter, and bearing means on the exterior of the housing for supporting and guiding said operating assembly.

5. A drive mechanism for the sustaining rotor of a helicopter or the like as described in claim 4, said operating means comprising a pair of rings each ring having diametrically opposed gear sectors thereon, and pinions on the pitch control mechanism engaging said sectors; a flange on the housing, a stop ring on the housing spaced from the flange, said pair of rings being disposed between the flange and the stop ring, and anti-friction means between the first-mentioned rings and the flange and stop ring.

6. A drive mechanism for the sustaining rotor of a helicopter or the like, comprising a drive member, torque multiplying means, clutch means connecting the drive member to the torque multiplying means, means connecting the torque multiplying means to the rotor, pitch control mechanism for the rotor including a wobble plate; a housing having a central portion enclosing the torque multiplying means, a cylindrical portion enclosing the clutch, and a portion having a cylindrical inner surface enclosing the control mechanism, said cylindrical inner surface serving to guide the wobble plate; operating means for the pitch control mechanism, and a member guided on the outer surface of the cylindrical portion of the housing for actuating said operating means.

7. A drive mechanism for the sustaining rotor of a helicopter or the like, comprising a drive member, torque multiplying means, clutch means for connecting the drive member to the torque multiplying means, a clutch control member, means connecting the torque multiplying means to the rotor, pitch control mechanism for the rotor, a housing for the clutch, torque multiplying means and pitch control mechanism; means supported by the housing for operating the pitch control mechanism and means operated by the pitch control mechanism operating means for operating the clutch control member.

8. A drive mechanism for the sustaining rotor of a helicopter or the like, comprising a drive member, torque multiplying means, clutch means for connecting the drive member to the torque multiplying means, fluid operated mechanism for operating the clutch means, said fluid operated mechanism including a hydraulic system and a dump valve therein, means connecting the torque multiplying means to the rotor, pitch control mechanism for the rotor including a rotatable element having a cam surface thereon, and a valve stem on the dump valve adapted to ride on said cam surface, the cam surface being so shaped that when the rotor is conditioned by the pitch control mechanism for substantially zero lift the dump valve is opened to release all pressure in the hydraulic system.

9. A drive mechanism for the sustaining rotor of a helicopter or the like, comprising a drive member, torque multiplying means, clutch means for connecting the drive member to the torque multiplying means, means connecting the torque multiplying means to the rotor, pitch control mechanism for the rotor; a housing for the clutch, torque multiplying means and pitch control mechanism; and means supported by the housing for operating the pitch control mechanism, said torque multiplying means comprising a plurality of different sized input gears, a plurality of countershaft gears meshing with said input gears, additional countershaft gears driven by the first-mentioned countershaft gears, a ring gear meshing with the additional countershaft gears, and means for connecting the input gears to the clutch means.

10. A drive mechanism for the sustaining rotor of a helicopter or the like, as described in claim 9, said clutch means comprising individual clutches for the input gears and power means for operating the clutches.

11. A drive mechanism for the sustaining rotor of a helicopter or the like, as described in claim 9, said clutch means comprising individual clutches for the input gears, fluid means for operating the clutches and valve means for selectively rendering the clutches operative.

12. A drive mechanism for the sustaining rotor of a helicopter or the like, comprising a drive member, torque multiplying means, clutch means for connecting the drive member to the torque multiplying means, fluid operated means for operating the clutch, said means including a hydraulic system and a dump valve, pitch control mechanism for the rotor adapted selectively to alter the rotor pitch from a zero lift position to intermediate or maximum lift positions, and means for operating the pitch control mechanism, said last-mentioned means being adapted to operate the dump valve to release all fluid pressure in the hydraulic system when the rotor is pitched for substantially zero lift.

WILLIAM L. SHEPPARD.

REFERENCES CITED

The following references are of record in the file of this patent:

UNITED STATES PATENTS

| Number | Name | Date |
|---|---|---|
| 2,319,781 | Pullin | May 25, 1943 |
| 1,819,075 | Darr | Aug. 18, 1931 |
| 2,256,635 | Young | Sept. 23, 1941 |
| 1,921,839 | Rawson | Aug. 8, 1933 |
| 2,183,119 | Larsen | Dec. 12, 1939 |
| 2,247,053 | Ellis | June 24, 1941 |
| 2,262,613 | Larsen | Nov. 11, 1941 |
| 2,074,342 | Platt | Mar. 23, 1937 |